US012011996B2

(12) United States Patent
Kan et al.

(10) Patent No.: US 12,011,996 B2
(45) Date of Patent: Jun. 18, 2024

(54) PEDAL ADJUSTMENT SYSTEM AND SEAT ADJUSTMENT SYSTEM, AND APPARATUS USING SAME

(71) Applicant: AXON SIMULATOR LTD., Burnaby (CA)

(72) Inventors: Tzu Yu Kan, Vancouver (CA); Yu Hao Chen, Vancouver (CA)

(73) Assignee: AXON SIMULATOR LTD (CA)

( * ) Notice: Subject to any disclaimer, the term of this patent is extended or adjusted under 35 U.S.C. 154(b) by 0 days.

(21) Appl. No.: 17/921,134

(22) PCT Filed: Apr. 30, 2020

(86) PCT No.: PCT/CA2020/050575
§ 371 (c)(1),
(2) Date: Oct. 25, 2022

(87) PCT Pub. No.: WO2021/217230
PCT Pub. Date: Nov. 4, 2021

(65) Prior Publication Data
US 2023/0185325 A1     Jun. 15, 2023

(51) Int. Cl.
*B60K 26/02*     (2006.01)
*G05G 1/40*      (2008.04)
*G09B 9/04*      (2006.01)

(52) U.S. Cl.
CPC ............ *B60K 26/02* (2013.01); *G05G 1/40* (2013.01); *G09B 9/04* (2013.01); *B60K 2026/024* (2013.01)

(58) Field of Classification Search
CPC .......... G05G 1/40; G05G 1/405; B60K 26/02; B60K 2026/024; G09B 9/04
See application file for complete search history.

(56) References Cited

U.S. PATENT DOCUMENTS

| 4,392,546 A * | 7/1983 | Brown | B62D 33/0604 |
| | | | 180/326 |
| 6,182,525 B1 * | 2/2001 | Bowers | B60K 23/02 |
| | | | 180/274 |

(Continued)

FOREIGN PATENT DOCUMENTS

| CN | 101842822 A | * | 9/2010 | ............. A63F 13/08 |
| CN | 110525210 A | * | 12/2019 | |

(Continued)

OTHER PUBLICATIONS

International Search Report from the International Searching Authority for PCT SN: PCT/CA2020/050575, dated Jan. 11, 2021 (8 pages).

(Continued)

*Primary Examiner* — Adam D Rogers
(74) *Attorney, Agent, or Firm* — Sand, Sebolt & Wernow Co., LPA

(57) ABSTRACT

A system for adjusting a control pedal distance and orientation relative to a user of a driving-related assembly, the system comprising a moveable pedal plate having a pedal assembly attachment region and at least one distal attachment point located near a distal end region thereof, and at least one proximal pivotable attachment point, each of the distal attachment point and proximal pivotable attachment point having respective distal coupling means and proximal pivotable coupling means. The system further comprises a connecting member having a pivotable coupling means located near respective first and second ends, wherein the pivotable coupling means located near the first end is matable with the proximal pivotable coupling means, and the second end is matable with a connecting member anchor. The system further comprises at least one substantially (Continued)

upright fixation member having a plurality of predetermined coupling points.

19 Claims, 11 Drawing Sheets

(56) References Cited

U.S. PATENT DOCUMENTS

| | | | |
|---|---|---|---|
| 6,318,785 B1* | 11/2001 | Tousignant | B60N 3/063 297/423.44 |
| 6,364,047 B1 | 4/2002 | Bortolon | |
| 7,343,830 B2* | 3/2008 | Rinero | G05G 1/405 74/512 |
| 9,261,894 B2* | 2/2016 | Stachniak | B64C 13/044 |
| 9,861,852 B2* | 1/2018 | Quinn | A63B 22/203 |
| 2005/0115354 A1 | 6/2005 | Rinero et al. | |
| 2006/0041359 A1 | 2/2006 | Ohtsubo et al. | |
| 2006/0169092 A1 | 8/2006 | Terradas et al. | |
| 2009/0241724 A1 | 10/2009 | Hilger et al. | |
| 2011/0023652 A1 | 2/2011 | Cosby et al. | |
| 2014/0251066 A1 | 9/2014 | Stachniak | |
| 2022/0176257 A1* | 6/2022 | Smit | A63F 13/90 |

FOREIGN PATENT DOCUMENTS

| | | | |
|---|---|---|---|
| JP | 2005335634 A | 12/2005 | |
| WO | WO-03044614 A1 * | 5/2003 | B60N 2/0224 |

OTHER PUBLICATIONS

Written Opinion of the International Searching Authority for PCT SN: PCT/CA2020/050575, dated Jan. 11, 2021 (6 pages).

* cited by examiner

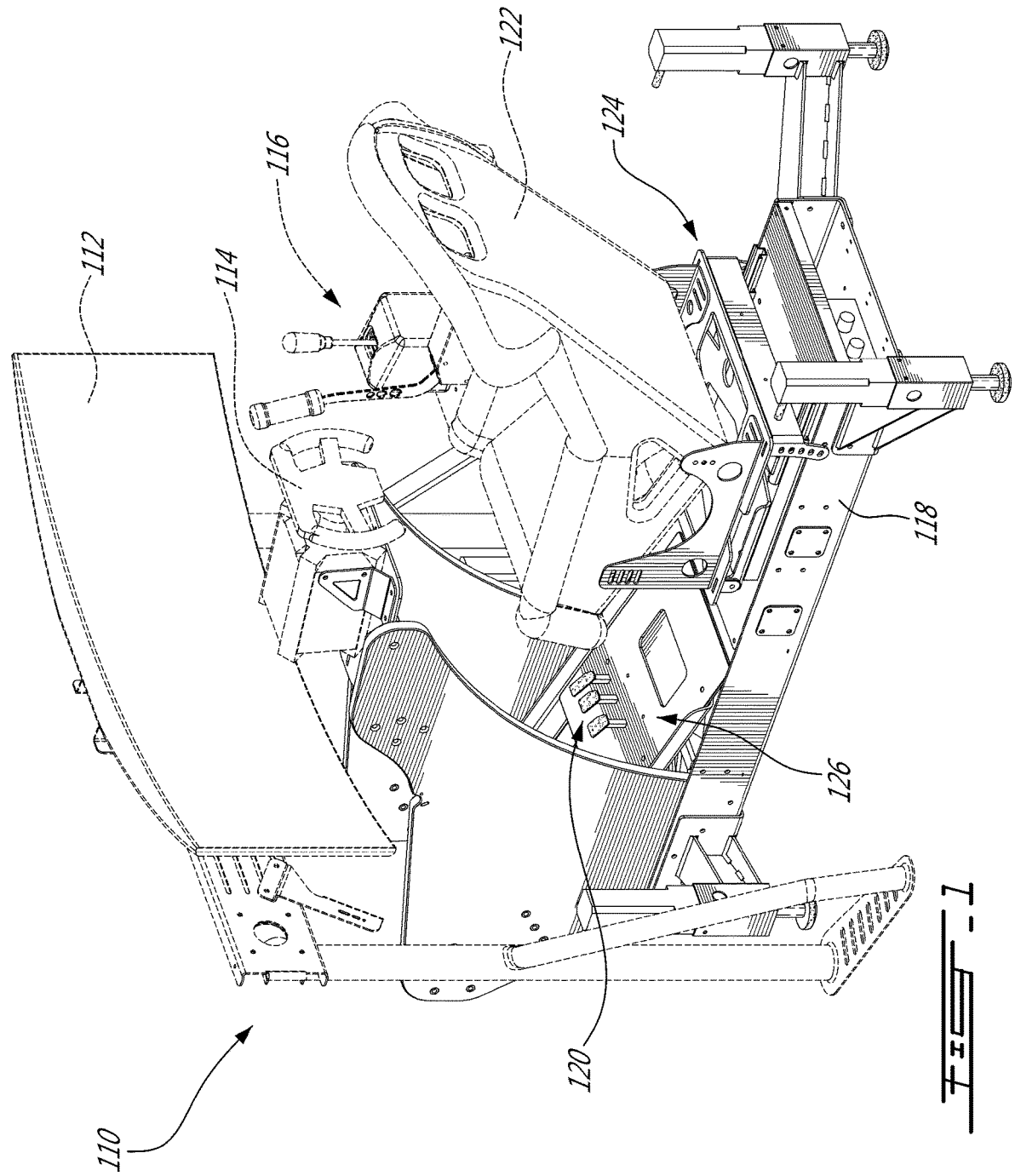

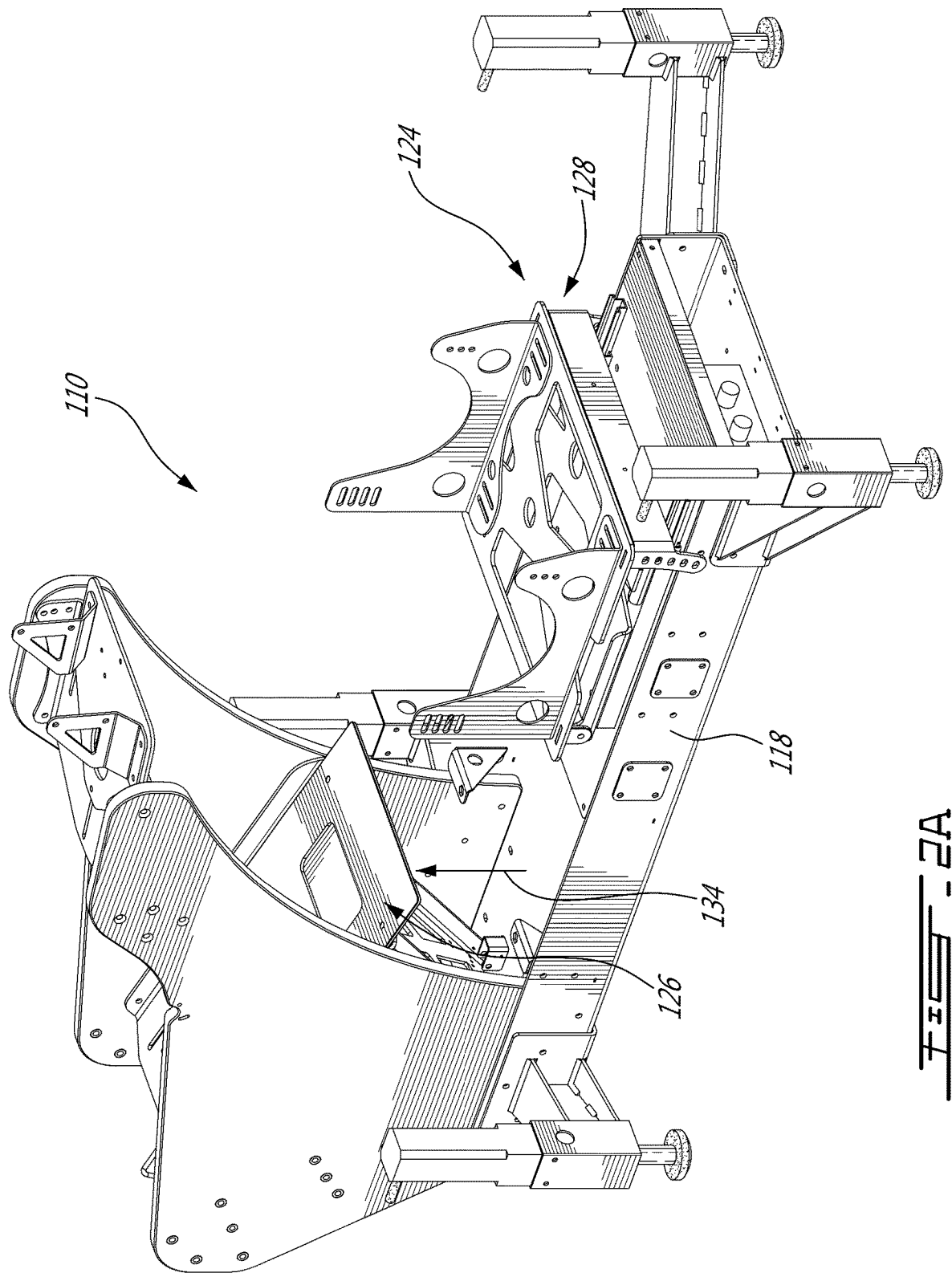

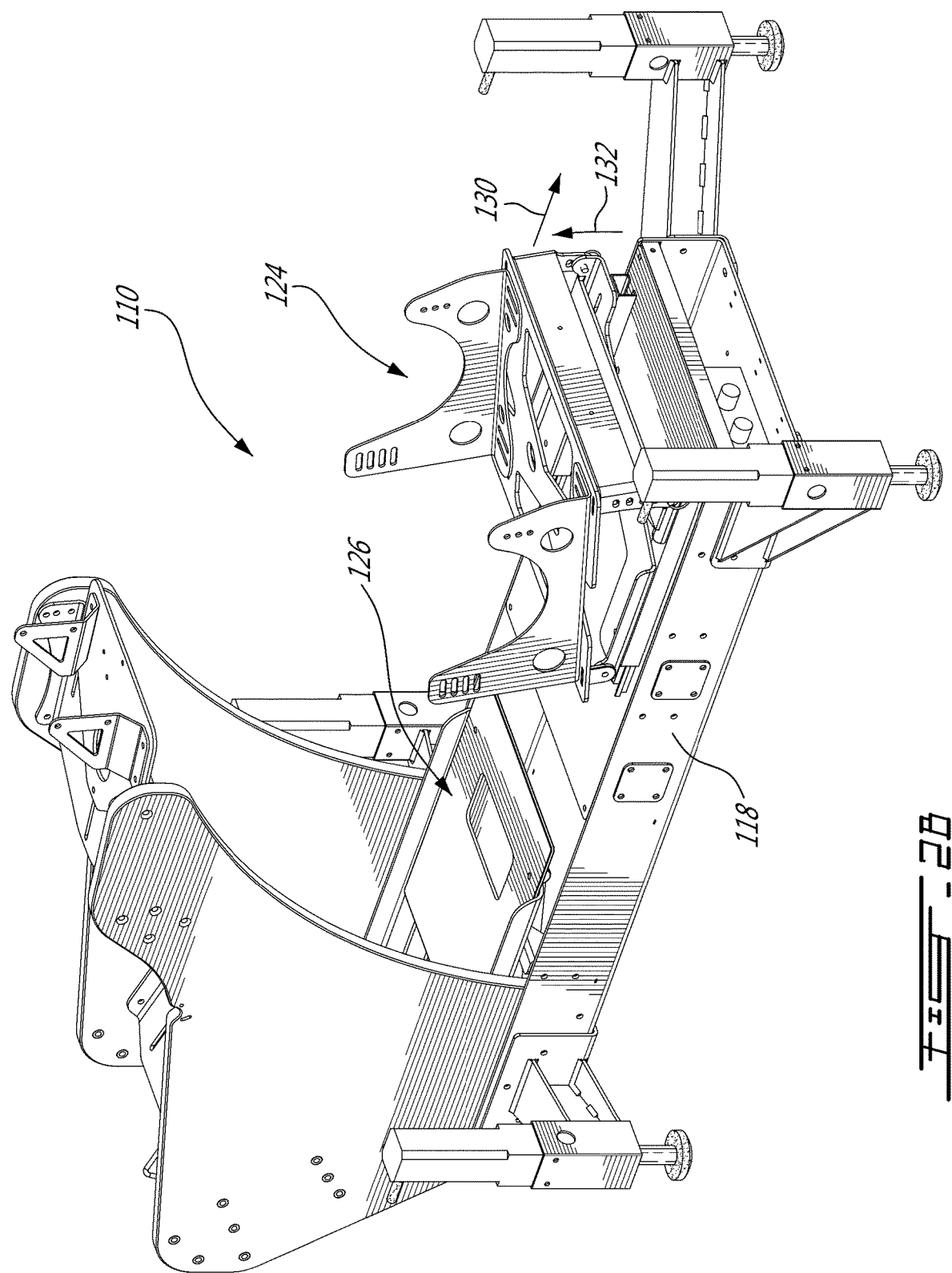

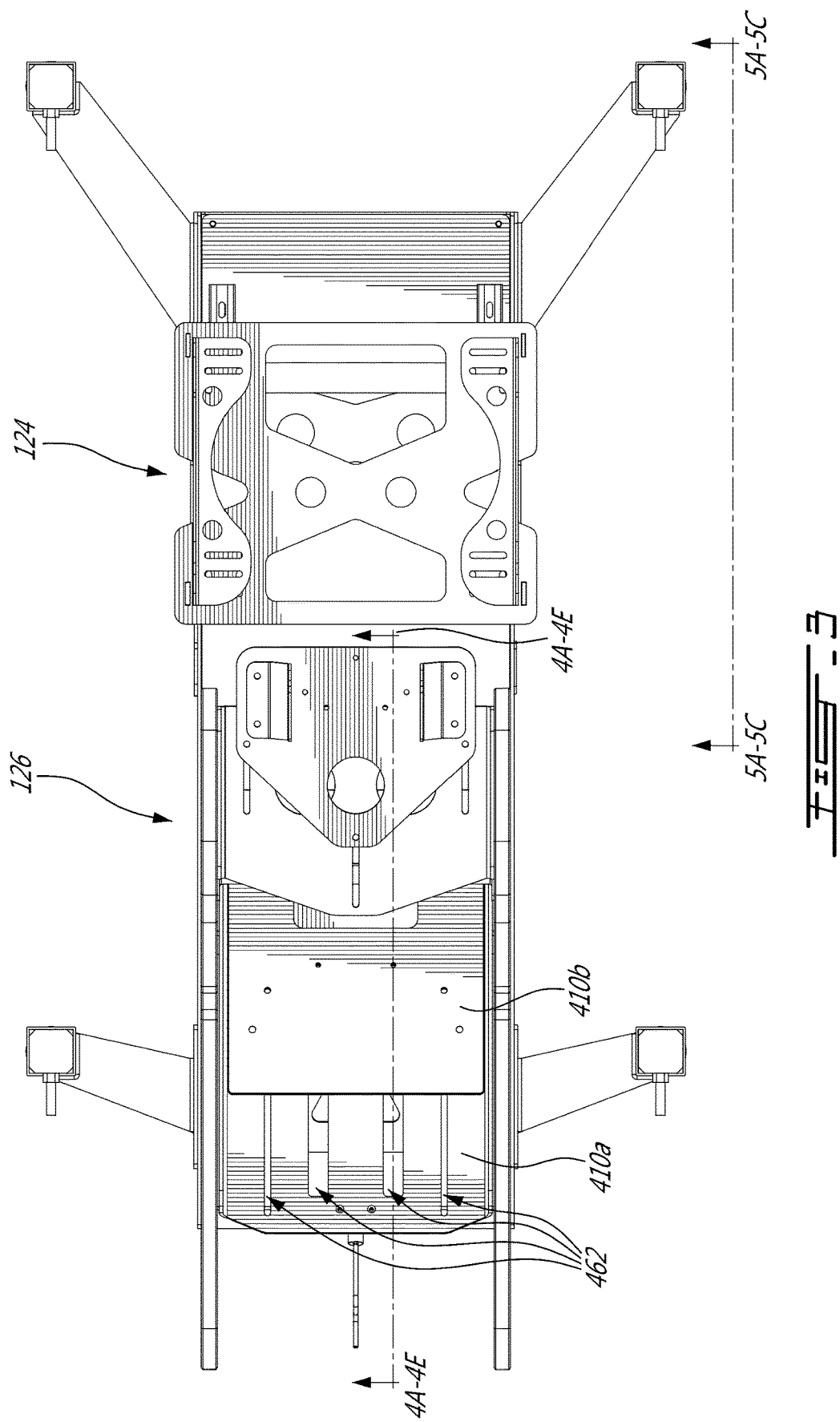

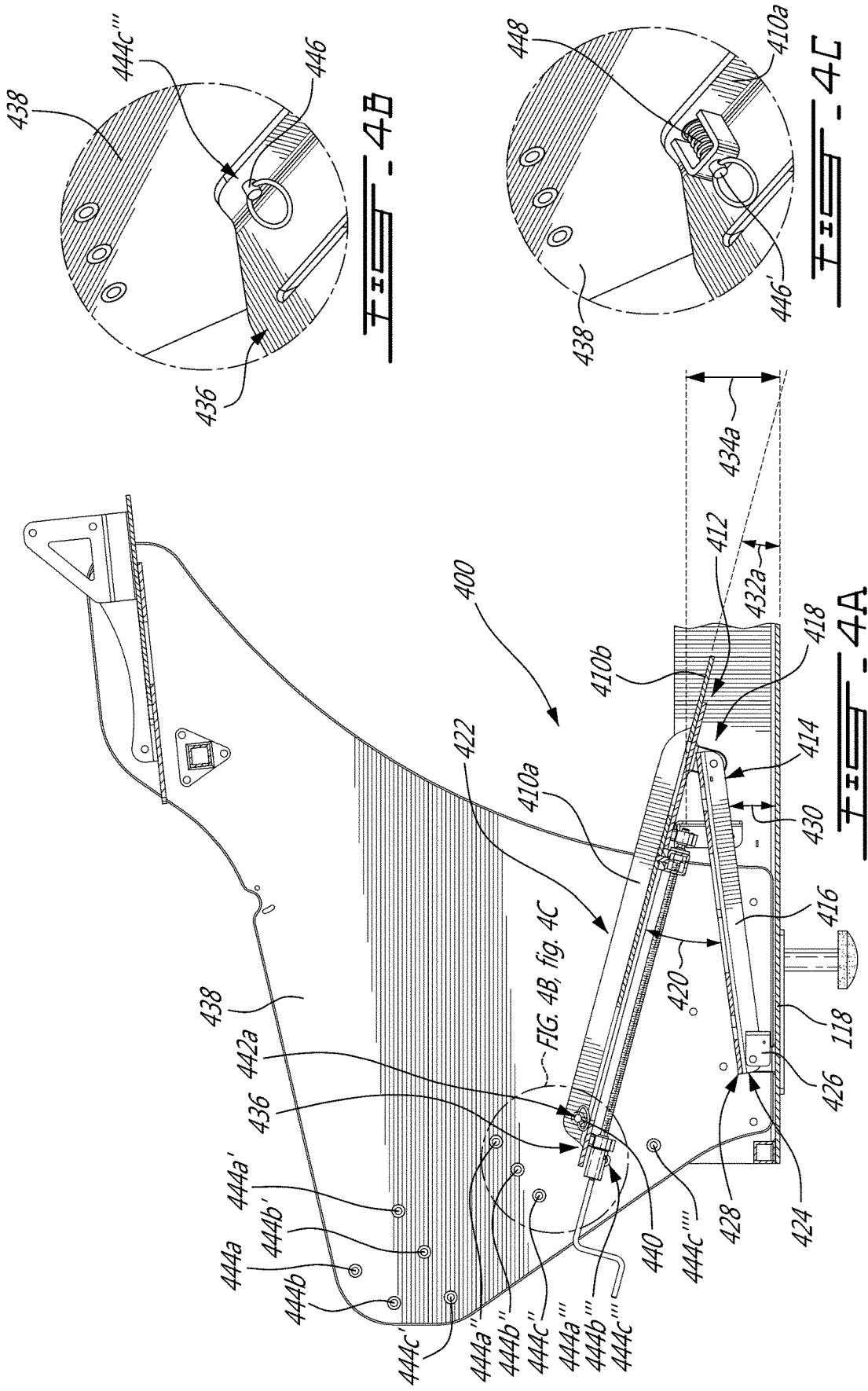

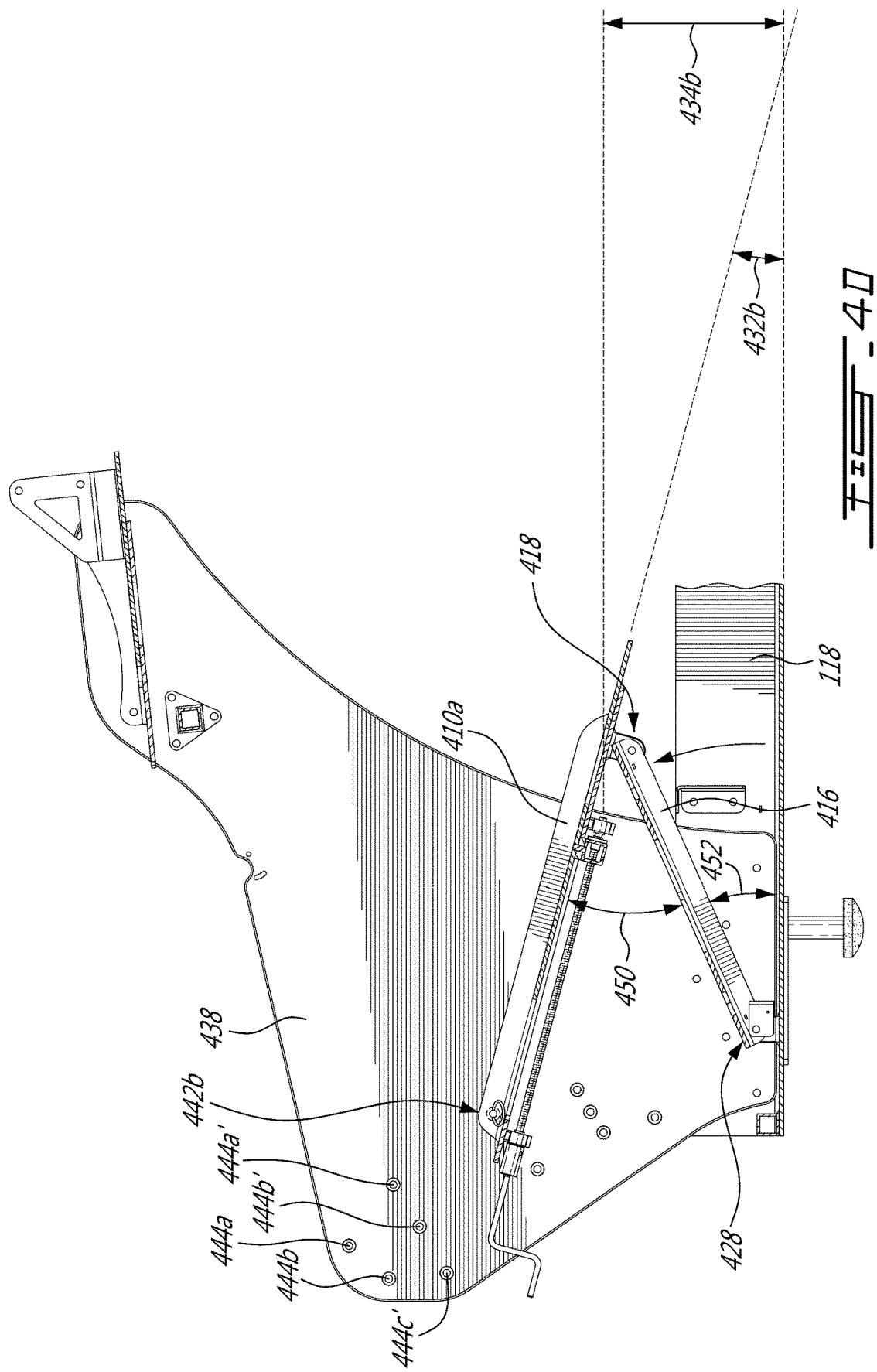

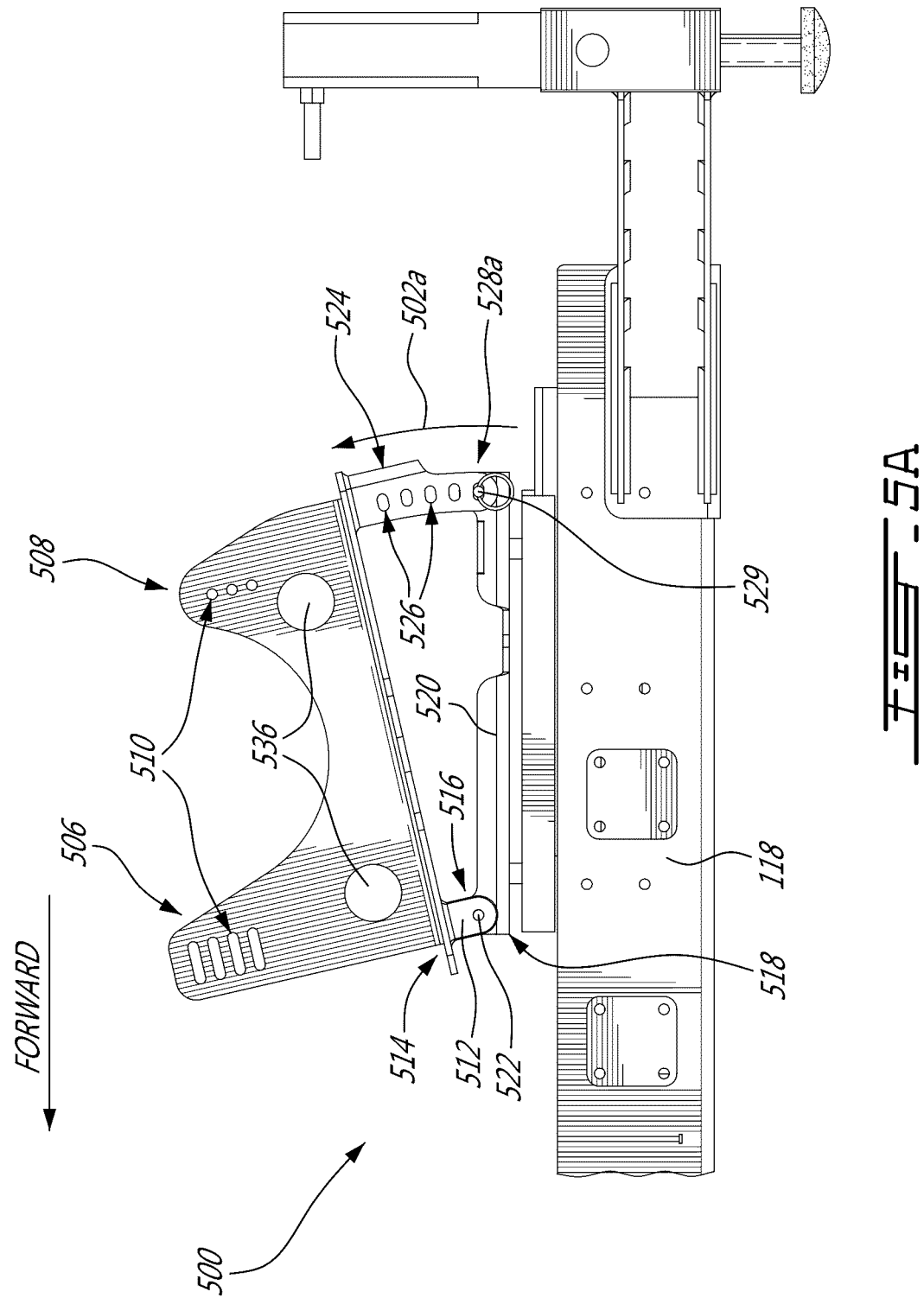

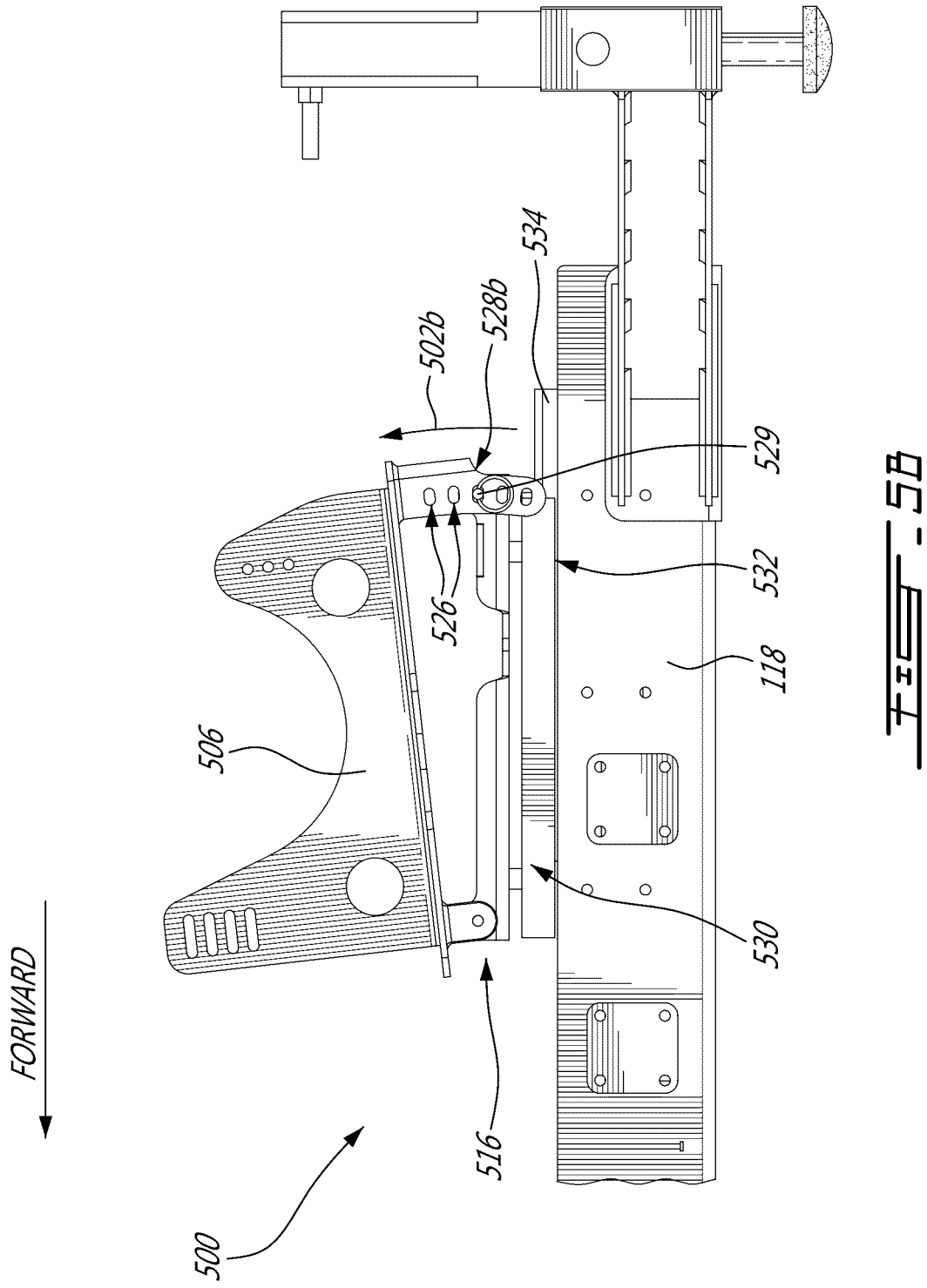

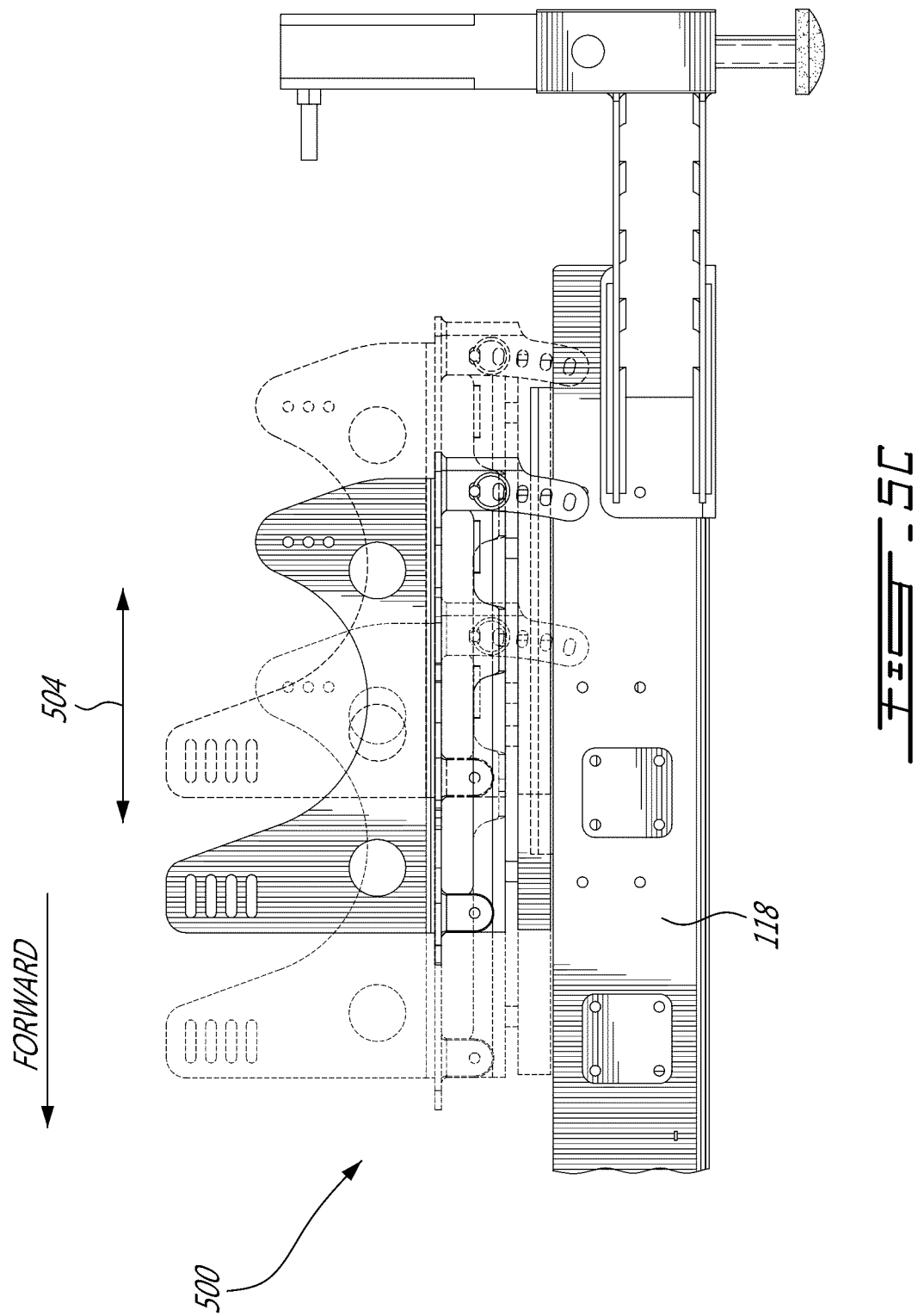

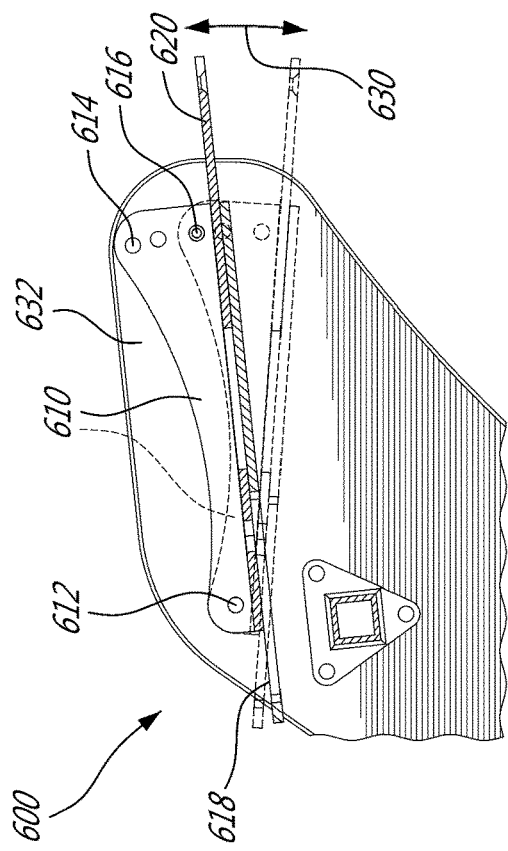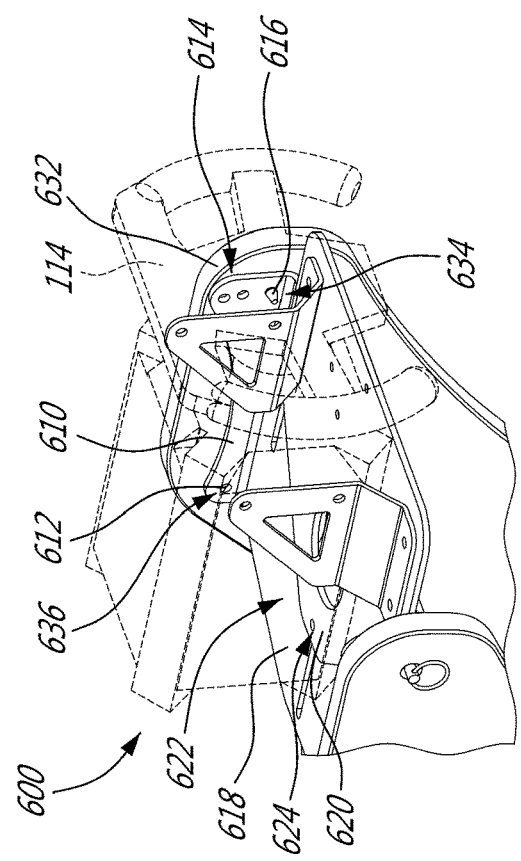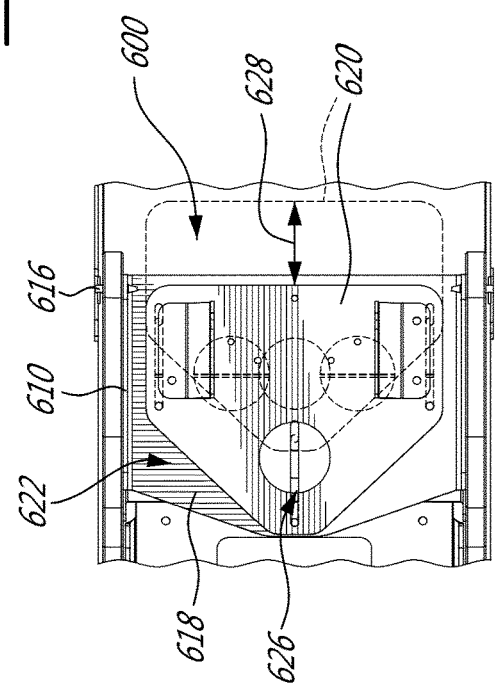

PEDAL ADJUSTMENT SYSTEM AND SEAT ADJUSTMENT SYSTEM, AND APPARATUS USING SAME

REFERENCE TO RELATED APPLICATIONS

This application is the U.S. National Phase Entry of International Patent Application Serial Number PCT/CA2020/050575, entitled "PEDAL ADJUSTMENT SYSTEM AND SEAT ADJUSTMENT SYSTEM, AND APPARATUS USING SAME", filed Apr. 30, 2020, the entire disclosure of which is incorporated herein by reference.

TECHNICAL FIELD

The present disclosure relates to mechanical adjustment systems, and, in particular, to a pedal adjustment system and a seat adjustment system, and an apparatus using same.

BACKGROUND OF THE INVENTION

Conventional automotive systems and simulators employ a variable seat position and/or orientation to accommodate different user body types and/or body dimensions. While such systems may allow for adjustment of, for instance, the distance between a user seating position and a pedal system, or a relatively small alteration of seat angle with respect to a driving surface, such systems are limited in the range of positions and orientations that can be achieved. Furthermore, such systems are typically dictated for a particular vehicle or simulator. That is, a Formula 1 race car simulator may have a significantly different position and orientation of a pedal system relative to those of a driver seat when compared with a North American muscle car simulator. A conventional apparatus may therefore have to sacrifice realism in order to accommodate more than one type of simulated vehicle. Moreover, the quality of a user experience in high performance vehicles and/or simulators thereof may arise from highly customised pedal and seat positions and orientations, which may not be achievable in conventional systems.

This background information is provided to reveal information believed by the applicant to be of possible relevance. No admission is necessarily intended, nor should be construed, that any of the preceding information constitutes prior art or forms part of the general common knowledge in the relevant art.

SUMMARY OF THE INVENTION

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a pedal adjustment system and a seat adjustment system, and an apparatus using same, that overcome some of the drawbacks of known techniques, or at least, provides a useful alternative thereto. Some aspects of this disclosure provide examples of such systems and apparatuses.

In accordance with one aspect, there is provided a system for adjusting a control pedal distance and a control pedal orientation relative to a user of a driving-related assembly, the system comprising a moveable pedal plate having a pedal assembly attachment region and at least one distal attachment point located near a distal end region thereof, and at least one proximal pivotable attachment point located near a proximal end region thereof, each of the distal attachment point and proximal pivotable attachment point having respective distal coupling means and proximal pivotable coupling means. The system further comprises a connecting member having a pivotable coupling means located near respective first and second ends, wherein the pivotable coupling means located near the first end is matable with the proximal pivotable coupling means to form a first articulable junction, and the second end is matable with a connecting member anchor to form a second articulable junction. They system further comprises at least one substantially upright fixation member having a plurality of predetermined coupling points, each for user-selectively mating with the distal coupling means for a third junction.

In some embodiments, the pedal assembly attachment region comprises a pedal distance adjuster comprising a pedal connector in biased translatable communication with a pedal assembly, and the pedal connector is articulable to undergo a proximal or distal translation relative to the movable pedal plate. In some embodiments, the pedal connector comprises a threaded surface mated to a threaded cylindrical bar, wherein a rotation of the cylindrical bar about an axis thereof actuates the proximal or distal translation relative to the movable pedal plate. In some embodiments, a first end of the cylindrical bar comprises a handle for a user-actuated rotation of said cylindrical bar. In other embodiments, the pedal distance adjuster is operably connected to a motor to actuate the proximal or distal translation automatically. In some embodiments, the pedal distance adjuster is in biased translatable communication with said pedal assembly via a pedal assembly plate, said pedal assembly plate having said pedal assembly mounted thereon.

In some embodiments, the substantially upright fixation member of the system comprises a surface of the driving-related assembly. In some embodiments, the substantially upright fixation member comprises an anchored bar.

In some embodiments, the plurality of predetermined coupling points is an array of one or more apertures. In some embodiments, the plurality of predetermined coupling points is located on the substantially upright fixation member so as to provide one or more moveable pedal plate angles wherein each of said one or more moveable pedal plate angles may be provided at a plurality of pedal heights relative seating position. In some embodiments, the plurality of predetermined coupling points is located on the substantially upright fixation member so as to provide one or more moveable pedal plate angles, each of which may be provided at a plurality of pedal distances relative a seating position.

In some embodiments, one or more of the first articulable junction or the second articulable junction comprises a hinge mechanism. In some embodiments, the hinge mechanism comprises an aperture and corresponding protrusion operable to extend through the aperture when in use.

In some embodiments, the pedal assembly attachment region is operably coupled to a pedal assembly.

In some embodiments, the third junction comprises a pin extending through respective apertures in said moveable pedal plate and said upright fixation member. In some embodiments, the pin is operably coupled to either one of the moveable pedal plate or the upright fixation member via a spring, and wherein the pin is automatically inserted through a corresponding aperture via a spring force.

In some embodiments, a pedal assembly comprising at least one pedal is coupled to the pedal assembly attachment.

In some embodiments, the driving-related assembly is any one of a motor vehicle, a race car, or a simulator thereof.

In accordance with another aspect, there is provided a system for adjusting a seat position and a seat orientation in a driving-related assembly, the system comprising: a seat fixture having a respective pivotable attachment region and variable coupling region, the variable coupling region including one or more user-selectable coupling points, and the seat fixture further comprising a seat attachment region having a seat coupling means. The system further comprises a connecting member having a forward pivotable coupling point in pivotable communication with the pivotable attachment region and a rearward coupling point for communication with the one or more user-selectable coupling points so as to provide a seat angle-selecting junction, and wherein the connecting member further has a lower connecting region located near a bottom region thereof configured to couple to the driving-related assembly.

In some embodiments, the lower connecting region is coupled to the driving-related assembly via a guided track and corresponding slot so to allow forward and rearward movement of the system relative to the driving-related assembly.

In some embodiments, the driving-related assembly comprises a plurality of predetermined frame coupling points, each for user-selectively mating with the lower connecting region of the connecting member. In some embodiments, the plurality of user-selectable coupling points comprises an array of apertures, said rearward connecting point comprises a connecting aperture, and said seat angle-selecting junction comprises a pin extending through said connecting aperture and one of said array of apertures.

In some embodiments, the system further comprises a seat coupled to the seat fixture at the seat coupling region.

In some embodiments, the driving-related assembly is any one of a motor vehicle, a race car, or a simulator thereof.

In accordance with another aspect, there is provided a driving-related apparatus adjustable to simulate various vehicle configurations for a user, the apparatus comprising a pedal adjustment system for adjusting a control pedal distance and a control pedal angle relative to the user of the driving-related apparatus, wherein the control pedal angle is maintainable at each one of a plurality of one or more predetermined control pedal distances relative to the user. The apparatus further comprises a seat adjustment system for adjusting a seat position and a seat orientation in the driving-related apparatus, and a steering wheel adjustment system for adjusting an orientation and a distance of a steering wheel relative to the user in the riving-related apparatus. The steering wheel adjustment system comprises a mounting plate having a respective pivotable attachment point and an angle-selecting coupling point, wherein the angle-selecting coupling point has one or more angle-selecting coupling means, and the mounting plate has a steering wheel assembly attachment region having a translatable steering wheel assembly coupling means. The steering wheel adjustment system further comprises a steering wheel assembly coupling member having a means for mounting the steering wheel, and a translatable mounting plate coupling means matable with the steering wheel assembly coupling means to form a translatable junction. The steering wheel adjustment system further comprises at least one anchoring member having a predetermined pivotable coupling means matable with the pivotable attachment point to form a pivotable wheel junction, and one or more angle-selecting anchor coupling means matable with the angle-selecting coupling point to form an angle-selecting steering junction.

In some embodiments, the pedal adjustment system is any system as described herein for adjusting a control pedal distance and a control pedal orientation relative to a user of a driving-related assembly.

In some embodiments, the seat adjustment system is any system as described herein for adjusting a seat position and a seat orientation in a driving-related assembly.

In accordance with another aspect, there is provided an adjustable pedal assembly for adjusting a pedal of a driving-related apparatus having a base frame, the adjustable pedal assembly comprising an articulated pedal attachment plate having a pedal attachment region for operatively attaching the pedal in relation thereto, and comprising a plate coupling element. The adjustable pedal assembly further comprises an articulating connection member pivotably coupled toward a distal end thereof to the articulated pedal attachment plate, and pivotably mountable toward an opposed end thereof to the base frame, such that a position and angle of the articulated pedal attachment plate can be adjusted through articulation of the attachment plate relative to the base frame via the articulating connection. The adjustable pedal assembly further comprises a substantially upright fixation member fixedly disposed relative to the base frame and comprising a set of predetermined fixation points, wherein the articulated pedal attachment plate is articulated to align the plate coupling element with a selected one of the predetermined fixation points to be releasably secured thereto in adjusting the pedal.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein:

FIG. 1 is a perspective view of a simulator apparatus comprising a pedal adjustment mechanism and a seat adjustment mechanism, in accordance with at least one of the various embodiments;

FIGS. 2A and 2B are perspective views of a portion of the simulator apparatus of FIG. 1 showing the pedal and seat adjustment mechanisms in different configurations to that of FIG. 1, in accordance with various embodiments;

FIG. 3 is a top plan view of a portion of the simulator apparatus of FIG. 1 showing the pedal adjustment mechanism and the seat adjustment mechanism thereof, in accordance with various embodiments;

FIGS. 4A, 4D, and 4E are side sectional elevational views of the pedal adjustment mechanism of FIG. 3, taken along line 4A-4E thereof, showing different pedal orientations;

FIG. 4B is a magnified view of a portion of the side sectional elevational view of FIG. 4A showing a reversible junction thereof, whereas FIG. 4C is a magnified view of an alternative reversible junction, in accordance with an alternate embodiment;

FIGS. 5A and 5B are side sectional elevational views of the seat adjustment mechanism of FIG. 3, taken along line 5A-5C thereof, showing different seat orientations;

FIG. 5C is a side sectional elevational view of the seat adjustment mechanism of FIG. 1 showing various seat positions in ghost;

FIG. 6A is a top perspective view of a steering wheel angle adjustment mechanism for a simulator apparatus, in accordance with various embodiments;

FIG. 6B is a side sectional elevation view of the steering wheel angle adjustment mechanism of FIG. 6A; and FIG. 6C a top plan view of a steering wheel angle adjustment of FIG. 6A.

Figure 4E:
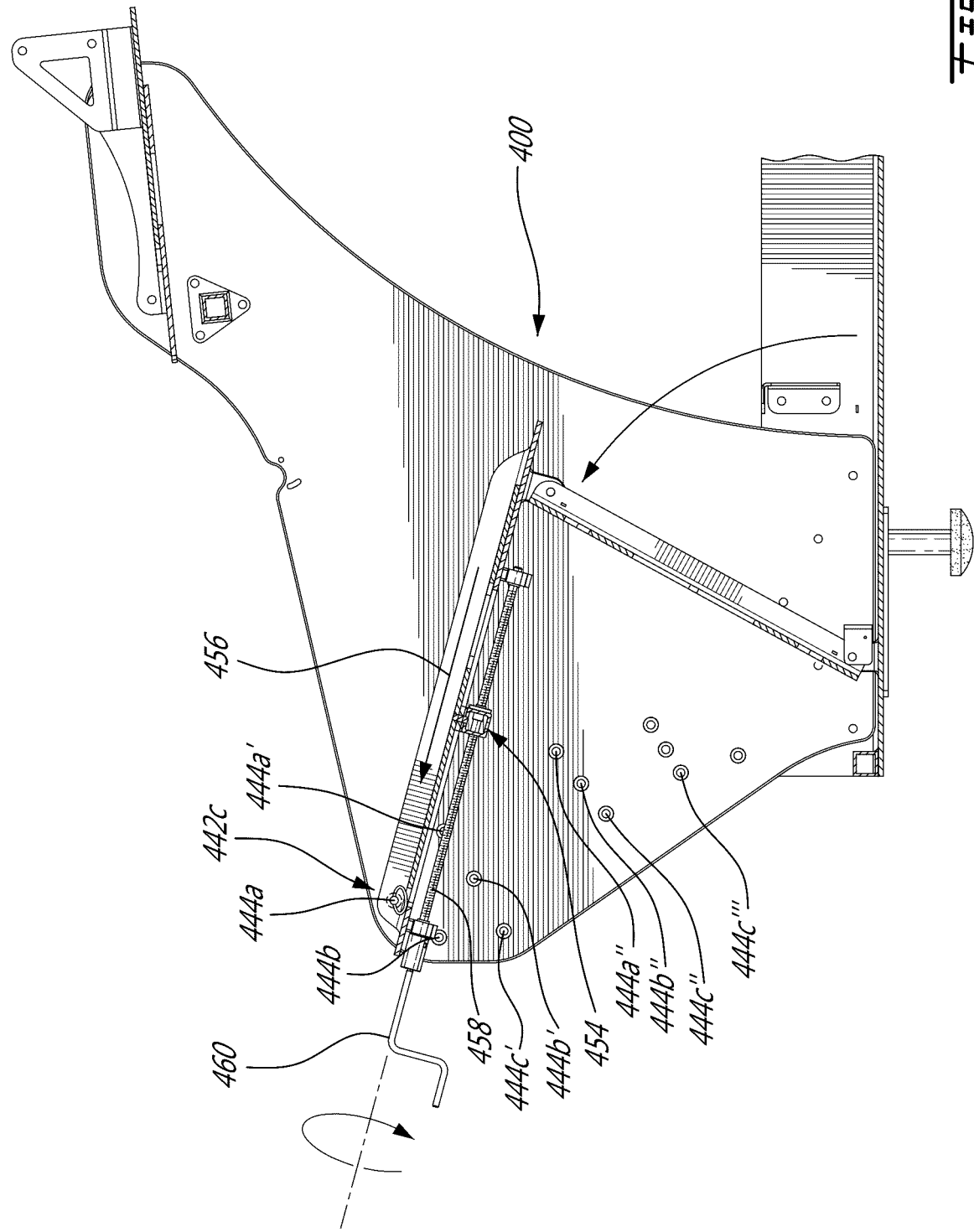

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

The systems and methods described herein provide, in accordance with different embodiments, different examples of an automotive- or driving-related assembly. Examples of such an assembly may include, but is not limited to, a car, truck, race car, aircraft, watercraft, or the like, or a simulator thereof.

With reference to FIG. 1, and in accordance with at least one exemplary embodiment, driving-related apparatus 110 will now be described. In this non-limiting example, the apparatus is operable to function as a driving simulator, and as such may comprise the necessary components to simulate various driving functions. For instance, and in accordance with various embodiments, the apparatus 110 may comprise a screen 112 operable to display a simulated environment by any of various means known in the art. A screen 112 may be flat or curved to improve a user experience, and may be operable to display two-dimensional or three-dimensional images, animations, videos, or the like, and may further be operable to produce audible sound related to a simulation. As will be appreciated by the skilled artisan, the apparatus 110 may further comprise, or be operable to interface with, one or more digital processors operable to execute simulation-related functions, such as the display of content on the screen 112.

A user may interact with a simulation through manipulation of various apparatus components, such as a steering wheel 114, gear shifter 116, or the like, and such interaction may illicit various simulation responses visible to the user on the screen 112. Components may be disposed at various respective positions and orientations on an apparatus frame 118, and may be fixed in place or may be adjustable to accommodate, for instance, a range of user body types, or to enable simulation of different functions and/or vehicles. For example, the position and orientation of a pedal set 120 relative to the driver of a race car may be substantially different from that of a pickup truck. As such, simulating racing conditions for the purpose of, for instance, training on a particular race track, may be improved by providing a seat arrangement and pedal orientation comparable to that of a race car. Similarly, as race cars may be customised to a specific driver, a race track simulation and/or user experience may be improved with user-specific component positions and orientations. As such, and in accordance with various embodiments, a driver seat 122 in a driving-related apparatus 110 may be disposed on, coupled to, or incorporate therein a seat adjustment mechanism 124 coupled to the frame 118 in such a manner that the seat position and/or angle relative to other apparatus components is adjustable. Similarly, the position and orientation of pedals 120 relative to the user may be tunable via mounting to, coupling to, or by incorporating thereon a pedal adjustment mechanism 126.

For instance, and in accordance with various embodiments, the apparatus 110 is shown in FIGS. 2A and 2B for two different positions and orientations of both the seat adjustment mechanism 124 and pedal adjustment mechanism 126 coupled to the apparatus frame 118, with other components removed from view for clarity. In FIG. 2A, the seat adjustment mechanism 124 is substantially parallel to the ground and is configured such that a seat (such as the seat 122 of FIG. 1, removed in FIGS. 2A and 2B for clarity) disposed thereon would be in an advanced position 128 (i.e. closer to the display 112 and steering wheel 114 of FIG. 1), while the pedal adjustment mechanism 126 is elevated at height 134 relative to the apparatus frame 118 and is angled relative to horizontal. In FIG. 2B, on the other hand, the seat adjustment mechanism 124 is situated rearwardly 130 and is configured to provide a more forward-angled seat orientation shown at arrow 132, while the pedal mechanism 126 is in lower relative to the apparatus frame 118 and oriented horizontally.

In the embodiment of FIG. 1, seat 124 and/or pedal 126 adjustment mechanisms may be independently user-selected to provide respective relative configurations in/on the apparatus 110. For instance, seat 124 and pedal 126 adjustment mechanisms may be configured to be representative of a particular application. For example, to simulate a race car configuration, it may be desirable to have a pedal adjustment system 126 configured horizontally in a lower position (i.e. closer to an apparatus frame 118 while having a seat adjustment system 124 with a relatively large angle 132 with respect to horizontal, as shown in FIG. 2B. The skilled artisan will appreciate that various other seat and pedal configurations may be selected independently for various applications.

Various embodiments relate to a seat adjustment mechanism and a pedal adjustment mechanism such as those shown in FIGS. 2A and 2B. As such, FIG. 3 shows a top view of the apparatus of FIGS. 2A and 2B, with dashed lines 4A-4E and 5A-5C indicating where exemplary embodiments of pedal adjustment mechanism 126 and seat adjustment mechanism 124 are shown, respectively, in side sectional elevation views in FIGS. 4A to 4E, FIGS. 5A to 5C.

With reference to FIG. 4A, and in accordance with at least one exemplary embodiment, a pedal adjustment mechanism 400 will now be described within the context of the apparatus 110 of FIGS. 1 and 3. Although not shown for simplicity, a pedal set, such as pedal set 120 shown in FIG. 1, would be mounted to, coupled to, or in some embodiments, incorporated on pedal plate 410a. In this example, the pedal adjustment mechanism 400 may enable adjustment of both a pedal distance and pedal orientation, as mounted to pedal plate 410a, relative to a user of the apparatus 110. In the illustrated embodiment, pedal adjustment mechanism 400 comprises an articulated pedal plate 410a connected to the apparatus frame 118 via articulating connecting member 416. In particular, the moveable pedal plate 410a is pivotably coupled at a proximal end region 412 thereof to a first end 414 of the connecting member 416 via a first articulatable junction 418. In accordance with various embodiments, the first articulatable junction 418 may comprise a flange, a pin and hole, a hinge, or other means known in the art for providing a pivotable coupling between the moveable pedal plate 410a and the connector plate 416, each with respective coupling means, while enabling rotation thereof with respect to one another (i.e. increase or decrease an angle 420 therebetween) in at least one dimension and/or direction. In this example, pedals (such as pedals 120 in FIG. 1) are removed from view for clarity, but may be coupled directly to the top side of the moveable pedal plate 410a, as noted above, at a pedal assembly attachment region 422, or may be coupled to a pedal assembly plate 410b disposed atop the moveable pedal plate 410a at a pedal attachment region 422 as further described below. In accordance with some embodiments, the attachment region 422 may enable a pedal or pedal assembly (or pedal assembly plate 410b having pedals coupled thereto) to shift proximally or distally (towards or away from a user, respectively) relative to the moveable pedal plate 410a, as described below, or may be fixed in place on the moveable plate 410a.

In accordance with various embodiments, a second end 424 of the connecting member 416 may be pivotably coupled to an anchor 426 via a second articulatable junction 428. In accordance with various embodiments, the second articulable junction 428 may comprise a flange, a pin and hole, a hinge, on other means known in the art for providing the second articulable junction 428 between the connecting member 416 and the anchor 426, each with a respective coupling means, while enabling rotation of the connecting member 416 about the anchor 426 in at least one dimension and/or direction. In accordance with various embodiments, the anchor 426 may a stationary anchor point relative to a fixed user position, may be disposed on the apparatus frame 118, or may comprise an attachment means disposed therein (e.g. a pin, a hole, a hinge, etc.), wherein rotation of the connecting member 416 at the second articulatable junction 428 may form an angle 430, as shown, for example in FIG. 4A, between the connecting member 416 and a horizontal plane.

In various embodiments, any one or more of the first 418 and second 428 articulable junctions may comprise one or more of a hinge, one or more apertures with a corresponding pin/protrusion passing therethrough, or the like.

In accordance with various embodiments, user-selected, adjustable pedal orientation and distance, reflected by the angle 432a and distance 434a, as shown in FIG. 4A, for example, of the moveable pedal plate 410a with respect to the apparatus frame 118 is enabled via articulated movement of the mobile pedal plate 410a and connecting member 416 about the first 418 and second 428 pivotable junctions shown. In order to affix pedal orientation and distance relative to a user during use, the moveable pedal plate 410a may be coupled at a distal region 436 thereof with a substantially upright fixation member 438 comprising a plurality of coupling points, examples of which are illustrated in FIG. 4A as elements 444a, 444b, 444a', 444b', 444c', 444a", 444b", 444c", 444a''', 444b''', 444c''', and 444c'''' (collectively herein referred to as a plurality of coupling points 444, which may include additional coupling points not explicitly noted with numerals), as shown in FIG. 4A, disposed therein/thereon to form a user-selectable third junction 442a. In accordance with various embodiments, coupling points 444, provided as holes or apertures in this example, receive a plate coupling element 446, such as a pin 446 (FIG. 4B) or portion thereof, such as a protrusion, of protruding from the distal end region 436 of the pedal plate 410a so as to reversibly couple the pedal plate to the upright fixation member 438 at one of a plurality of available coupling points 444. The skilled artisan will appreciate that a pin 446, spring-biased securing pin 446', or other like protrusion may be inserted from any side of any one or more of the junctions herein described.

In preferred embodiments, as shown in FIGS. 4A to 4E, the distal end region 436 is also provided with an aperture 440 for receiving therethrough a pin 446 (FIG. 4B), or alternatively a spring-biased pin 446' (FIG. 4C), for reversibly mating the distal end region 436 at a desired one of the apertures 444 of the upright fixation member 438 so as to form the user-selectable third junction 442a. In accordance with various embodiments, the third junction 442a may comprise a flange, a pin and hole, or other means known in the art for correspondingly mating the position of the distal end region 436 of the moveable pedal plate 410a relative to the upright fixation member 438. In accordance with various embodiments, the fixation member 438 may comprise a stationary anchor point relative to a fixed user position, or may be a component of or be disposed on the apparatus frame 118, such as a wall or vertical bar of the apparatus 110.

In the illustrated embodiment, the third junction 442a comprises one of an array of holes or apertures 444 in the vertically oriented fixation member 438 of the apparatus 110, a hole/aperture 440 in the moveable pedal plate 410a, and a pin 446 (or protrusion), as noted above, passing through one of the apertures 444 and aperture 440 in a reversible fashion (i.e. the pin may be manually removed to adjust a pedal position, and reinserted through another of the array of holes 444 to adjust an ultimate pedal position for use). In an alternate embodiment, as shown illustratively in FIG. 4C, a pin 446' for reversibly fixing the moveable pedal plate 410a to the upright fixation member 438 may be operably coupled to either component via a spring mechanism 448, for example, or other such biasing means, whereby it is automatically engaged by a spring force within one of apertures 444 upon release to reversibly couple moveable pedal plate 410a to the fixation member 438. The skilled artisan will appreciate that various other means known in the art for providing a self-coupling pin mechanism 448 may fall within the scope of the disclosure.

In other embodiments, any one or more of the first 418, second 428, and third 442a junctions may comprise more than one junction. For example, the third junction 442a may comprise two similar junctions in two substantially upright fixation members 438 on either side of a simulator apparatus 110, or the first junction 418 may comprise two or more hinges coupling the moveable pedal plate and the connecting member 416.

In accordance with various embodiments, the moveable pedal plate angle shown at 432a and vertical distance 434a from an apparatus frame in FIG. 4A may be adjusted, as shown in FIG. 4D. In this example, the pedal adjustment mechanism 400 has been reconfigured by adjusting the first junction 418 angle 450 between the moveable pedal plate 410a and connecting member 416, and the angle 452 between the connecting member 416 and apparatus frame 118, by fixing the movable pedal plate 410a to a different one of the array of coupling points 444 on the upright fixation member 438, thus forming a new third junction 442b. As such, a second angle 432b and vertical distance 434b from the apparatus frame 118 is produced, thereby selecting a new pedal distance and orientation relative to the user.

Similarly, FIG. 4E shows a third orientation of the various components of the adjustable pedal mechanism 400, selected by forming the third junction 442c at a new one of the plurality of coupling points 444, for instance via a pin mechanism as shown in FIG. 4B or 4C.

In accordance with various embodiments, coupling points 444 may be distributed in/on the upright fixation member 438 so provide a predetermined set of resultant pedal positions, such as those that may be commonly required by user body types and sizes, or those corresponding to common pedal positions and orientations in designated vehicles (e.g. race cars, trucks, etc.). Furthermore, and in accordance with some non-limiting embodiments, coupling points 444 may be distributed so to provide preferred pedal angles (e.g. 432a, 432b, 432c), one or more of which may be provided at a plurality of heights (e.g. 434a, 434b).

For example, coupling points 444 in FIGS. 4A to 4E are distributed in clusters of one aperture (e.g. 444c''''), two apertures (e.g. 444a and 444b), and three apertures (e.g. 444a', 444b', and 444c') so to provide one to three angles at different pedal heights and/or distances from a user. For instance, the letter (e.g. a, b, or c) in the nomenclature of the coupling point elements 444 indicate a designated movable pedal plate angle, while the number of prime symbols (e.g. ', '', ''', '''') represents a designated pedal height and/or distance from a user. For example, in FIG. 4a, the junction 442a is formed using the coupling point 444a'''(the rightmost aperture in the cluster indicated with three primes) to provide angle 432a, while the junction 442b in FIG. 4D is formed with the aperture 444a'' (the rightmost aperture in the cluster indicated with two primes) to form angle 432b. In this case, angles 432a and 432b are the same angle with respect to horizontal, while the pedal plate 410a is at different heights (represented by heights 434a and 434b, respectively). Conversely, junctions formed using apertures of the same cluster (e.g. 444a', 444b', 444c') may provide different pedal plate 410a angles, but at a common height. Examples of common pedal angles, in accordance with various embodiments, may be 0 degrees (i.e. horizontal, as provided by, for example, apertures 444c', 444c'', 444c''', and 444c''''), approximately 6 degrees (e.g. 444b, 444b', 444b'', and 444c''', and 444c''''), and approximately 12 degrees (e.g. 444a, 444a', 444a'', and 444a'''), although embodiments are not limited to such angles.

In accordance with further embodiments, FIG. 4E illustrates a pedal distance adjuster 454, whereby a pedal position and orientation relative to a user may be further finely adjusted via movement shown at arrow 456 of the pedal distance adjuster 454, to which the pedals or a pedal assembly may be mounted or coupled. Various embodiments relate to movement of pedal distance adjuster 454 via a motor or other automatic means, or by rotation of various mated threaded components, as shown, for example, in the figures. For instance, FIG. 4E shows the threaded pedal distance adjuster 454 mated with a threaded rod 458, the rotation of which via a handle 460 may laterally move the pedal distance adjuster, and thus move a connected pedal or pedal assembly, such as that of element 120 of FIG. 1, not shown in FIG. 4E for clarity, for fine-tuning of the pedal distance from the user.

In accordance with various embodiments, the pedal distance adjuster 454 may be coupled directly to a pedal or pedal assembly to proximally or distally move pedals relative to the movable pedal plate 410a. Alternatively, the pedal distance adjuster may be coupled to a pedal assembly plate 410b (e.g. FIG. 3, FIG. 4A) on which a pedal or pedal assembly is mounted, whereby the pedal distance adjuster 454 may alter a pedal distance from a user by proximally or distally moving the pedal assembly plate 410b relative to the moveable pedal plate 410a. In some embodiments, a pedal distance adjuster 454 may couple to a pedal assembly or to a pedal assembly plate 410b through, for instance, holes or slits 462 in the movable pedal plate 410a, as shown in FIG. 3, which may allow for proximal or distal movement relative thereto of the pedal assembly or pedal assembly plate 410b.

In other embodiments, a pedal or pedal assembly, such as that of element 120 of FIG. 1, not shown in FIG. 4E for clarity, may be coupled directly to the moveable pedal plate 410a, rather than to a pedal distance adjuster 454 or pedal assembly plate 410b. In either case, various embodiments relate to a pedal adjustment mechanism 400 that further comprises a pedal or pedal assembly. A pedal or pedal assembly may optionally further comprise an angle adjustment mechanism, wherein the angle between one or more pedals and the moveable pedal plate 410a may be altered, for instance to accommodate various users or to approximate various geometries of one or more vehicles. In such apparatuses, although not shown for simplicity, one or more pedals may correspond to, for example, one or more of an accelerator, a decelerator (brake), a clutch, or the like. Furthermore, a pedal assembly may be coupled with the movable pedal plate 410a via one or more intermediary components. For instance, a pedal assembly may be fixed to a pedal assembly plate 410b, which may be in turn be coupled to the movable pedal plate 410a.

With reference to FIGS. 5A to 5C, and in accordance with various exemplary embodiments, an adjustable seat mounting bracket 500 for mounting a seat, such as seat 122 shown in FIG. 1, will now be described within the context of the apparatus 110 of FIGS. 1 and 3. In these examples, the adjustable seat mounting bracket 500 may enable adjustment of both a seat orientation 502a (FIG. 5A) and a seat position 504 (FIG. 5C) in the driving-related assembly 110, such as a motor vehicle (e.g. car, truck, boat, plane, racecar, or the like, or a simulator thereof) as shown in FIG. 1. In accordance with various embodiments, the adjustable seat mounting bracket 500 of FIG. 5A may be operably coupled, either in a fixed or movable manner (e.g. to translate a seat forwards or backwards) to the apparatus frame 118, such as that of a race car simulator.

In some embodiments, an adjustable seat mounting bracket 500 may comprise a seat fixture 506 having a seat attachment region 508, whereby a seat (e.g. a driver's seat 122 of FIG. 1) may be coupled via a seat coupling means 510, such as one or more apertures 510, slots 510, attachable features, or the like. In accordance with various embodiments, a plurality of seat coupling means 510 may be disposed on a seat fixture so to provide multiple attachment points for the seat 122, so as to allow for a further adjustment of a seat position and/or orientation (e.g. seat tilt angle as provided by coupling to selected one or more of multiple attachment points 510) when in use. A seat fixture 506 may further comprise features 536 such as holes, which may serve as, for instance, additional seat coupling means, or a means of reducing an overall weight of the mechanism 500 or apparatus 110.

Various embodiments relate to a seat fixture 506 comprising a pivotable attachment point 512 at a forward region 514 thereof. The pivotable attachment point 512 may form a pivotable junction 516 with a corresponding coupling means disposed on/in a forward region 518 of a connecting member 520. The pivotable junction 516 may comprise, for instance, a hinge, or one or more holes in one or more of the seat fixture 506 and connecting member 520 through which a pin 522 or similar component may be inserted such that the seat fixture 506 and connecting member 520 may rotate about the pivotable junction 516 in one or more directions and/or dimensions. The skilled artisan will appreciate that other means known in the art for forming a pivotable junction 516 lie within the scope of the disclosure.

The seat fixture 506 may, in accordance with various embodiments, further comprise a rearwardly located variable coupling region 524 in turn comprising a plurality of coupling points 526 comprising an array of apertures 526 operable to couple with a corresponding rearward coupling region of the connecting member 520 to form a seat angle-selecting first junction 528a, as provided by selecting a first one of the array of apertures 526. For instance, a variable coupling region 524 may comprise the array of apertures 526 or other like anchor points distributed such that a user selection of one of the apertures 526 may confer a designated angle as indicated at arrow 502a to the seat fixture 506 (and therefore seat 122, not shown, connected thereto) relative to the connecting member 520 upon formation of the first junction 528a, such as via the insertion of a pin 529 or like mechanism therethrough. Some embodiments relate to the pin 529 having similar properties to those of FIG. 4B or 4C for selecting among a plurality of seat positions and orientations. For instance, FIG. 5B shows an adjustable seat mechanism angle indicated at arrow 502b between the seat fixture 506 and connecting member 520 that is smaller than the corresponding angle indicated by arrow 502a in FIG. 5A. In accordance with various embodiments, angle 502b may be selected by forming a third junction 528b at a different aperture of the array of apertures 526. Accordingly, various other seat angles may be provided in various embodiments by selecting other ones of the various apertures 526.

Furthermore, it will be appreciated by the skilled artisan that a seat fixture 506, in accordance with various embodiments, may comprise more than one component. For instance, a seat attachment region 510 may comprise a first rigid body having seat coupling means 510, while the pivotable attachment point 512 and variable coupling region 524 may be disposed on/in a second rigid body, wherein the first and second rigid bodies may be coupled to one another in a seat adjustment mechanism 500.

In accordance with various embodiments, the pivotable junction 516 and angle-selecting junction 528a or 528b, as well as their constituent components, may be located at respective opposite ends from those abovementioned of the seat fixture and connecting member 520. That is, while FIG. 5B shows the pivotable junction 516 at a forward location of the seat adjustment mechanism 500 (relative to the direction a seated user is facing when the mechanism 500 is in use), various other embodiments may relate to the pivotable junction 516 and the constituent components being located at a rearward region of mechanism 500, while the angle-selecting junction may be located in a forward region of the mechanism 500. Accordingly, the skilled artisan will appreciate that various seat angles may be provided with similar mechanisms located at respective forward and rearwards regions that raise and/or lower respective ends of the seat fixture 506.

With reference to FIG. 5B, various embodiments may further relate to the connecting member 520 having a lower connecting region 530 disposed so as to couple the connecting member 520 and thus seat fixture 506 to the apparatus frame 118 at a fourth junction 532. For instance, the connecting region 530 may be located on a lower region of the adjustable seat mounting bracket 500 so as to couple with an upper surface of the frame 118. In accordance with various embodiments, fourth junction 532 may comprise a mechanism known in the art to movably couple the adjustable seat mounting bracket 500 to the frame 118, as shown in FIG. 5C. For instance, an upper region of the frame 118 may comprise a guided track 534, while the lower connecting region 530 may comprise a slot allowing fore/aft movement, whereby the seat mechanism 500 may be fixed at a desired position relative to frame 118 during use. In accordance with various embodiments, such a movable fourth junction 532 may comprise, for instance, an array of slots within a guided track 534 in which a protrusion on the lower connecting region 530 may be slotted to select a fore/aft seat position. Alternatively, the adjustable seat mounting bracket 500 may be statically coupled such that no fore and aft adjustment relative to the frame 118 is permitted, for instance via a screw-like or other clamping or locking mechanism (not shown) known in the art for forming a static fourth junction 532.

In accordance with various embodiments, the frame 118 may comprise a plurality of coupling points, such as a series or grooves at predetermined locations of the frame 118, such that the lower connecting region 530 may form the fourth junction 532 at one of several locations, thereby providing a user-selectable seat position/distance (fore/aft) relative to, for instance, other apparatus components such as a pedal assembly or steering wheel, similar to that noted above. For instance, and in accordance with various embodiments, FIG. 5C shows the seat adjustment mechanism 500 reversibly coupled to the apparatus frame 118 at various user-selectable positions as indicated by arrow 504. As the skilled artisan will appreciate, such user-selectable positions may, in accordance with various embodiments, be provided by a track set and/or slider mechanism, or other such means known in the art, coupled with one or more of the apparatus frame 118 and the lower connecting region 530, without departing from the scope of the disclosure.

With reference to FIGS. 6A to 6C, and in accordance with some embodiments, an apparatus, such as the apparatus 110 of FIG. 1, may further comprise a steering wheel adjustment mechanism 600 for adjusting an orientation and a distance of a steering wheel 114 relative to a user of the apparatus 110. In accordance with some embodiments, a steering wheel adjustment mechanism 600 may comprise a mounting plate 618 having a respective pivotable attachment point 612 and one or more angle-selecting coupling points 614, such as the array of apertures 614 shown in FIGS. 6A and 6B. The mounting plate 618 may comprise, for instance, a rigid-bodied, substantially horizontal surface that is coupled via, for instance, one or more apertures and screws, to one or more side walls 610, which in turn may comprise a pivotable attachment point 612 and an angle-selecting coupling point 614. Alternatively, the mounting plate may comprise a single rigid-bodied piece with a substantially flat surface 618 and one or more sides 610 oriented approximately perpendicularly to the substantially flat surface 618 and having the pivotable attachment point 612 and an angle-selecting coupling points 614 disposed therein/thereon.

In accordance with various embodiments, the mounting plate 618 may be coupled at a steering wheel assembly attachment region 622 to the steering wheel 114 and/or steering wheel assembly directly, or via a steering wheel assembly coupling member 620, as shown in FIGS. 6A to 6C. The mounting plate 618 and coupling member 620 may be coupled therebetween in a translatable fashion via respective translatable coupling means 624, such as a tongue and groove, or slot and protruding member, configured to mate therebetween to form a translatable junction 626, as shown in FIG. 6C. The translatable junction 626 may allow for the connecting member 620, and therefore a steering wheel assembly or steering wheel 114 coupled thereto, to translate relative to the mounting plate 618 to permit a movement 628 of the steering wheel 114 closer to or farther away from a user.

In order to select a steering wheel orientation, the mounting plate 618 or side wall 610 thereof may be coupled with an anchoring member 632 (e.g. a wall of the apparatus 110, or substantially upright fixation member 632 such as an anchored bar) having a respective designated pivotable coupling means, such as an aperture (e.g. an aperture in the a side wall 632 of the apparatus 110 that is concentric with that of the pivotable attachment point 612 of the mounting plate, not shown for clarity in FIGS. 6A and 6B). Mating therebetween by any means known in the art, such as by the insertion of a pin or like protruding member, may form a pivotable steering wheel junction 636 which enables the mounting plate 618 to pivot therearound.

The anchoring member 632 may further comprise one or more one angle-selecting anchor coupling means, such as an array of one or more apertures in a side wall 632 of the apparatus (coupling means on the anchoring member 632 not shown for clarity, but the reader may reference the array of apertures 444 in FIG. 4A for an example of such a coupling means disposed on a side wall 438 of an apparatus 110), wherein any one of the angle-selecting anchor coupling means may be mated with one of the angle-selecting coupling points 614 of the mounting plate 618 or sidewall 610 thereof in order to form an angle-selecting steering junction 634. In accordance with various embodiments, the steering junction 634 may be formed, for instance, by inserting a pin or like protruding member 616 through one the array of apertures 614 of the mounting plate wall 610 and an aperture in the anchoring member 632, or may be formed by another means known in the art for forming a reversible junction 634 via respective coupling means on the mounting plate and anchoring member.

Different embodiments relate to various coupling means configurations for forming a steering junction 634. For instance, the mounting plate side wall 610 may comprise a plurality of coupling points 614 while the anchoring member 632 may comprise a single anchoring coupling means, whereby a steering wheel angle 630 is selected by coupling a desired one of the array 614 with the means disposed on the anchoring member 632, as shown in FIGS. 6A and 6B. In other embodiments, the mounting plate wall 610 may comprise a single coupling means 614, while the anchoring member 632 comprises an array of apertures, as illustrated in FIG. 4A with the array of apertures 444 one of which is user-selected to form the steering junction 634 to provide a steering wheel angle 630. Furthermore, while FIGS. 6A to 6C illustrate a single angle-selecting steering junction 634, various embodiments relate to a plurality of such junctions 634 for selecting a steering wheel angle 630. For example, the mounting plate 618 may further comprise a second side wall 610 configured to form a secondary pivotable junction (e.g. the junction 636) and angle-selecting steering junction (e.g. the junction 634) with a second anchoring member (e.g. a different apparatus wall 632), on a different side of the mounting plate 618. While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Furthermore, no element, component, or method step in the present disclosure is intended to be dedicated to the public regardless of whether the element, component, or method step is explicitly recited in the claims. However, various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A system for adjusting a control pedal distance and a control pedal orientation relative to a user of a driving-related assembly, the system comprising:
   a moveable pedal plate having at least one pedal assembly attachment region and at least one distal attachment point located at a distal end region thereof, and at least one proximal pivotable attachment point located at a proximal end region thereof, said distal attachment point correspondingly matable with one of a plurality of predetermined coupling points located on at least one substantially upright fixation member; and said proximal pivotable attachment point pivotably couplable with a first end of
   a connecting member forming a first articulable junction; said connecting member having a second end matable with a connecting member anchor to form a second articulable junction; and
   said plurality of predetermined coupling points each for user-selectively mating with said distal attachment point for forming a third junction.

2. The system of claim 1, wherein said pedal assembly attachment region comprises a pedal distance adjuster, said pedal distance adjuster coupled with a pedal assembly, said pedal distance adjuster operable to cause a proximal or distal translation of said pedal assembly relative to said movable pedal plate.

3. The system of claim 2, wherein said pedal distance adjuster comprises threaded components operable to actuate said proximal or distal translation upon rotation of a threaded rod correspondingly mated with said threaded components.

4. The system of claim 2, wherein said pedal distance adjuster is in biased translatable communication with said pedal assembly via a pedal assembly plate, said pedal assembly plate having said pedal assembly mounted thereon.

5. The system of claim 1, wherein said substantially upright fixation member comprises a surface of the driving-related assembly.

6. The system of claim 1, wherein said substantially upright fixation member comprises an anchor for pivotably coupling with a connecting member.

7. The system of claim 1, wherein said plurality of predetermined coupling points is an array of one or more apertures.

8. The system of claim 1, wherein said plurality of predetermined coupling points located on said substantially upright fixation member provide one or more moveable pedal plate angles wherein each of said one or more moveable pedal plate angles may be provided at a plurality of pedal heights and/or pedal distances relative to a seating position.

9. The system of claim 1, wherein one or more of said first articulable junction or said second articulable junction comprises a hinge mechanism; and wherein said hinge mechanism comprises an aperture and corresponding protrusion operable to extend through said aperture when in use.

10. The system of claim 1, wherein said pedal assembly attachment region is operably coupled to a pedal assembly.

11. The system of claim 1, wherein said third junction comprises a pin extending through a moveable pedal plate aperture located in said moveable pedal plate and; wherein said predetermined coupling points is provided as one of one or more upright fixation member apertures located in said upright fixation member for receiving said pin; and wherein said pin is operably coupled to either one of said moveable pedal plate or said upright fixation member via a spring, and wherein said pin is automatically inserted through a corresponding one of the apertures via a spring force.

12. An adjustable pedal assembly for adjusting at least one pedal of a driving-related apparatus having a base frame, the adjustable pedal assembly comprising:
   an articulated pedal attachment plate having a pedal attachment region for operatively attaching the at least one pedal in relation thereto, and comprising a plate coupling element;
   an articulating connection member pivotably coupled toward a distal end thereof to said articulated pedal attachment plate, and pivotably mountable toward an opposed end thereof to the base frame, such that a position of said articulated pedal attachment plate can be adjusted through articulation of said articulated pedal attachment plate relative to the base frame via said articulating connection member; and
   a substantially upright fixation member fixedly disposed relative to the base frame and comprising a set of predetermined fixation points;
   wherein said articulated pedal attachment plate is articulable to align said plate coupling element with a selected one of said predetermined fixation points to be releasably secured thereto in adjusting the at least one pedal.

13. The system of claim 12, wherein said pedal attachment region comprises a pedal distance adjuster, said pedal distance adjuster coupled with the at least one pedal, said pedal distance assembly operable to cause a proximal or distal translation of said pedal assembly relative to said articulated pedal attachment plate.

14. The system of claim 13, wherein said pedal distance adjuster comprises a threaded surface mated to a threaded cylindrical bar, wherein a rotation of said cylindrical bar about an axis thereof actuates said proximal or distal translation relative to said articulated pedal attachment plate.

15. The system of claim 14, wherein a first end of said cylindrical bar comprises a handle for a user-actuated rotation of said cylindrical bar.

16. The system of claim 13, wherein said pedal distance adjuster is in biased translatable communication with said pedal assembly via a pedal assembly plate, said pedal assembly plate having said pedal assembly mounted thereon.

17. The system of claim 12, wherein said substantially upright fixation member comprises a surface of a driving-related assembly.

18. The system of claim 12, wherein said set of predetermined coupling fixation points is an array of one or more apertures.

19. The system of claim 12, wherein said set of predetermined fixation points located on said substantially upright fixation member each provide one or more articulated pedal attachment plate angles wherein each of said one or more articulated pedal attachment plate angles may be provided at a plurality of pedal heights and/or pedal distances relative to a seating position.

* * * * *